United States Patent [19]

Catros

[11] Patent Number: 4,651,193

[45] Date of Patent: Mar. 17, 1987

[54] METHOD AND APPARATUS FOR BRIDGING CLOSELY SPACED MOVING ZONES IN A TELEVISION IMAGE AND FOR DIFFERENTIALLY CODING THE BRIDGING ZONES AND THE MOVING ZONES

[75] Inventor: Jean-Yves Catros, Rennes, France

[73] Assignee: Thomson CSF, Paris, France

[21] Appl. No.: 609,820

[22] Filed: May 14, 1984

[30] Foreign Application Priority Data

May 27, 1983 [FR] France .............................. 83 08827

[51] Int. Cl.⁴ ........................ H04N 7/13; H04N 11/04
[52] U.S. Cl. ...................................... 358/13; 358/136
[58] Field of Search ................... 358/12, 13, 105, 135, 358/136

[56] References Cited

U.S. PATENT DOCUMENTS

| | | | |
|---|---|---|---|
| 3,553,362 | 1/1971 | Mounts | 358/136 |
| 3,761,613 | 9/1973 | Limb | 358/136 |
| 3,825,832 | 7/1974 | Frei | 358/135 |
| 4,006,297 | 2/1977 | Koga | 358/136 |

OTHER PUBLICATIONS

Wendt, "Schmalband–Codierung", Nachrichtentechniche Zeitschrift, vol. 30, No. 3, Mar. 1977, pp. 245–250.
Bostelmann, "Ein Codec fur Bildfernsprechsignale mit Subjektiv Optimiertem Bewegungsdetektor", Frequenz, vol. 33, No. 1, Jan. 1979, pp. 3–8.
Dennis, "Quantiser Selection for Interframe Differential Pulse Code Modulation of Television Pictures", Electronics Letters, vol. 15, No. 5, Mar. 1979, pp. 142–144.

*Primary Examiner*—John W. Shepperd
*Attorney, Agent, or Firm*—Cushman, Darby & Cushman

[57] ABSTRACT

The coding device for a television transmitter includes an addressing and coding circuit for coding the values of the luminance and/or chrominance signals of each image point in accordance with a first code when the corresponding points are located in moving zones and in accordance with a second code when the corresponding points are located in widened zones, the widened zones including non-moving points which are within a predetermined distance of moving points. A concatenation circuit forms a concatenated series of codes obtained in order to transmit said codes over the transmission channel by means of transmission circuits. A bridging circuit initiates coding of the luminance and/or chrominance values in accordance with the first and second codes. A moving detector is coupled through a first input to the output of an image memory and receives on a second input each current luminance and/or chrominance signal to be coded. The moving detector compares the value of each current signal with the value of the corresponding signal of the current point of the previous image stored in the image memory and initiates, by means of the bridging circuit and as a function of the comparison results obtained, the production of the first and second code sequence by the addressing and coding circuit.

16 Claims, 6 Drawing Figures

FIG_5
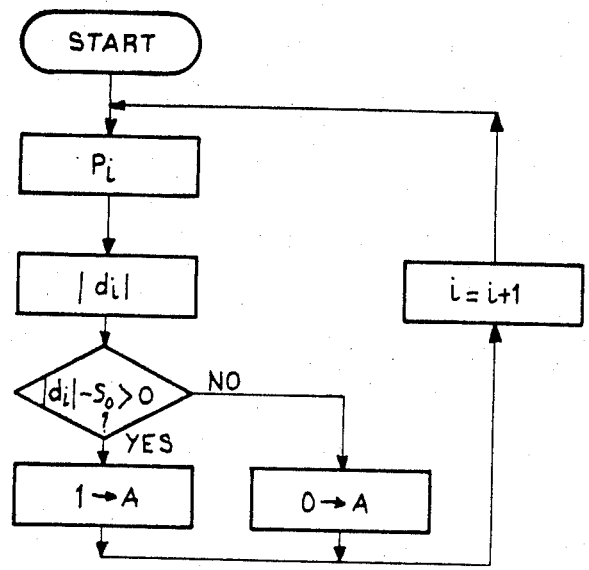
FIG_6
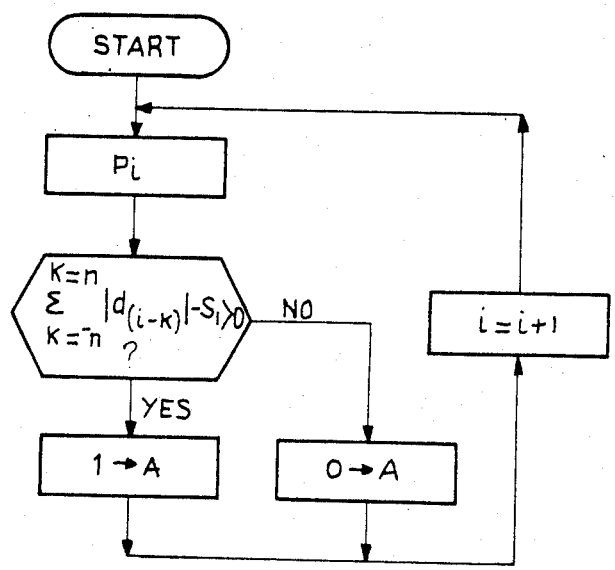

METHOD AND APPARATUS FOR BRIDGING CLOSELY SPACED MOVING ZONES IN A TELEVISION IMAGE AND FOR DIFFERENTIALLY CODING THE BRIDGING ZONES AND THE MOVING ZONES

BACKGROUND OF THE INVENTION

1. Field of the Invention

The invention relates to a method and a device for coding at low data-rate cost for conditional-replenishment television systems.

2. Description of the Prior Art

In its simplest form, coding of each sample of a luminance and/or color difference television signal is carried out over a length of eight bits, thus entailing the need for a very high bit rate.

In order to reduce the bit rate while maintaining acceptable picture quality, there are a number of known methods and devices, most of which utilize the redundancy of information contained in an image (picture) or in an image sequence.

One known method consists, for example, after transmission of an initialization image, in transmitting for the following images only those points in which the luminance changes to an appreciable extent from one image to the next. This method is sometimes designated as conditional replenishment and makes it possible to obtain high compression ratios which increase as the detection thresholds (with respect to which the amplitude of the luminance signals is compared) become higher.

As the compression ratios are higher, however, so the image reconstructed at the receiver exhibits a greater number of imperfections which give the viewer the impression of looking through a dirty window.

These defects appear mainly in the pseudo-uniform areas of the image in which the inter-image difference of each point is located in the vicinity of the detection threshold. In view of the fact that the areas stated as moving (moving areas) are replenished and that the areas stated as fixed (fixed areas) are not replenished, this results in fairly considerable coding errors of the order of magnitude of the detection threshold in the case of the points classed in the areas stated as fixed. Since the eye is very sensitive to defects in uniform areas, these errors are all the more visible. A further disadvantage lies in the fact that the position of the erroneous points changes continuously from one image to the next.

SUMMARY OF THE INVENTION

The object of the invention is to overcome the disadvantages mentioned in the foregoing.

To this end, the invention relates to a method of coding at low data-rate cost for conditional-replenishment television systems, of the type comprising at least one television transmitter and at least one television receiver which are linked by means of a transmission channel, the data being representative of the values of luminance and/or chrominance of the points of the transmitted television image. The method essentially consists in detecting the moving points of the image, in constructing from the moving points which have been detected an image composed of at least three types of areas hereinafter designated as zones. The zones of the first type are moving zones containing the moving points which have been detected. The zones of the second type are widened zones containing the points which are adjacent to the zones of the first type and are detected within a border at the edge of each moving zone. The zones of the third type contain the remaining fixed points of the image. The method further consists in coding respectively by means of the different codes the values of luminance and/or chrominance of the points belonging to the zones of the first type and of the points belonging to the zones of the second type while accompanying each zone of the first type by an identification datum for identifying said zone in the image in order to transmit only the codes and data for identification of the zones of the first type and only the codes of the zones of the second type.

The invention further relates to a coding device for carrying out said method.

BRIEF DESCRIPTION OF THE DRAWINGS

Other features of the invention will be more apparent upon consideration of the following description and accompanying drawings, wherein:

FIGS. 5 and 6 depict methods of detecting the moving points of the image according to the present invention.

DETAILED DESCRIPTION OF THE INVENTION.

Figure 1:
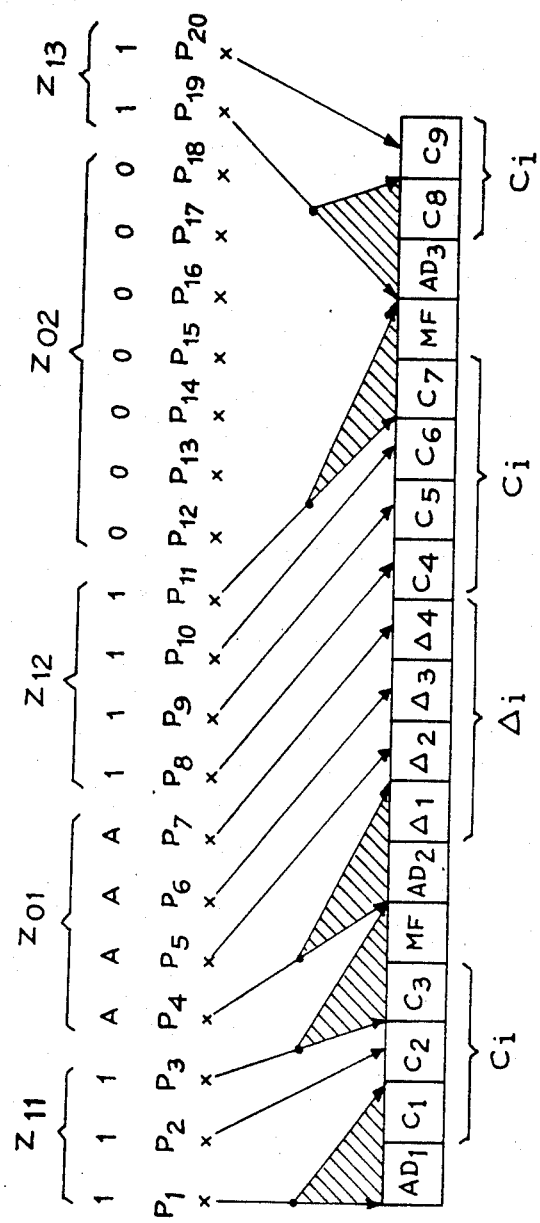
FIG. 1 is a diagram representing a mode of concatenation of the codes obtained by the method of coding in accordance with the invention.

The method of coding in accordance with the invention and illustrated in the diagram of FIG. 1 comprises four main steps which can in turn be subdivided into one or a number of intermediate steps. In a first step, the method consists in locating the moving image points in each image transmitted by a television camera and assigning a binary value to each detected point. For example, the binary value 0 is assigned to the image points which are identified as fixed and the binary value 1 is assigned to the image points which are identified as moving. The diagram of FIG. 1 represents a series of binary values (1 and 0) assigned to a series of points $P_1$ to $P_{20}$ of an image scan line. The complete set of points coded in this manner is representative of an image coded at two levels, namely a first level or "0" (zero) level at which all the fixed zones of the image are located and a second level or "1" level at which all the moving zones of the image are located.

In the second step of the method, only the values of the luminance and/or chrominance signals of the image points which are stated as moving are coded in series of first codes ($C_i$ in FIG. 1), this coding being accompanied by identification data which will permit image reconstruction at the receivers. In a preferred but non-limitative mode of execution of the invention, it will be possible to perform this coding operation by adopting the well-known methods of differential coding for the achievement of maximum compression of the encoded data rate in the transmission channel which links the transmitter to the receiver. Identification will be performed, for example, by locating on each line the start-of-zone addresses and end-of-zone addresses in respect of the moving zones, these addresses being located if necessary with respect to the start-of-line position.

In the third step of the method, the points of the widened zones of the image located on the border of each moving zone are also coded in series of second codes ($\Delta_i$ in FIG. 1).

In a preferred but non-limitative mode of execution of the invention, widened zones can also be detected from the points of one or a number of lines of the image. These points are located respectively on each line between two zone-limiting points which mark in one case the end of one moving zone intercepted by the line and in the other case the start of the moving zone which is also intercepted by the line which immediately follows, the distance between two limiting points of a line being shorter than a predetermined fixed length. By artificially widening the detected space of a moving zone, this important step of the method makes it possible to remedy the above-mentioned "dirty window" effect which appears mainly in the fixed image zones located in proximity to the moving zones.

Finally, the fourth step of the method consists in concatenating or chaining the codes obtained and the identification data in respect of each television frame in the order shown in FIG. 1 and in transmitting this concatenated series or catena over the transmission channel in order to enable the receiver to reconstruct the television image from the previous frame which has been reconstituted or transmitted directly at the time of initialization of the transmission. In FIG. 1, the image points ($P_1$ to $P_3$), ($P_8$ to $P_{11}$) and ($P_{19}$, $P_{20}$) are moving points forming part of the three moving zones denoted respectively by $Z_{11}$, $Z_{12}$ and $Z_{13}$ and the binary value of their locating bits is 1. The image points ($P_4$ to $P_7$) and ($P_{12}$ to $P_{18}$) are fixed points distributed respectively within two zones denoted by $Z_{01}$ and $Z_{02}$. The luminance and/or chrominance signal of each point of the moving zones $Z_{11}$, $Z_{12}$, $Z_{13}$ is coded and the corresponding codes designated respectively by the notations ($C_1$ to $C_3$); ($C_4$ to $C_6$) and ($C_8$, $C_9$) are stored in the order of the detected moving points. Each moving zone is identified by a start-of-zone address $AD_1$ and an end-of-zone word MF. Each address $AD_1$ corresponding to the position of the point $P_1$ on the image scan line is placed in the catena of FIG. 1 at the head end of the codes of the zone $Z_{11}$ designated by said address. In the case of the zones stated as fixed, FIG. 1 shows a difference in processing between the zones $Z_{01}$ and $Z_{02}$. Thus the points of the zone $Z_{01}$ are coded by means of the codes designated respectively by the notations $\Delta_1$ to $\Delta_n$ whereas the points of the zone $Z_{02}$ are not coded. This difference arises from the fact that, in the example under consideration, the moving zones $Z_{11}$ and $Z_{12}$ are considered as sufficiently close together to entail a risk of appearance of erroneous points in the zone $Z_{01}$ which produces the "dirty window" effect mentioned above. In order to remove this danger, the points of the zone $Z_{01}$ are coded. On the other hand, the case of the zones $Z_{12}$ and $Z_{13}$ corresponds to that of distant zones in which the above-mentioned defect does not appear. In consequence, those points of the line which are located in the zone $Z_{02}$ are not coded. In the case of coding of the zone $Z_{01}$, the corresponding codes $\Delta_i$ are placed at the head end with respect to the codes $C_i$ of the adjacent zone $Z_{12}$ and the series of codes $\Delta_i$, $C_i$ is preceded in the catena by identification of position or of address $AD_2$ which designates the start of the zone $Z_{12}$. Since coding of the points of the widened zones can take place only in respect of points located between the consecutive limits of two moving zones located at a distance from each other which is shorter than a predetermined fixed length, the number of possible codes $\Delta_i$ of a widened zone cannot exceed a fixed number $N_o$. The operation just mentioned carries out a process which will hereinafter be designated as "bridging of closely spaced moving zones". In the following description, the number $N_o$ will define the maximum bridge size which can be produced between two moving zones.

Figure 2:
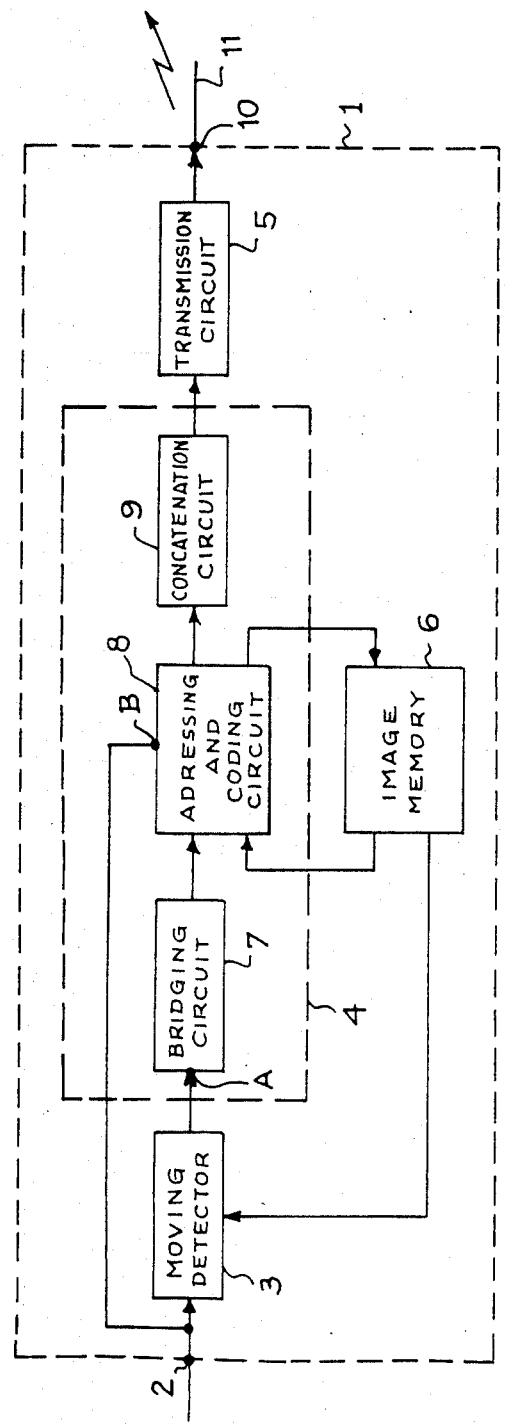
FIG. 2 is a general block diagram of the device of the invention which is employed in a conditional-replenishment transmitter and applies the method in accordance with the invention.

The coding device will now be described with reference to FIGS. 2 to 4. The device shown at 1 in FIG. 2 within a dashed-line rectangle receives on its input 2 the digital television signal to be transmitted. Said device comprises a moving detector 3, a device 4 which has the function of addressing and coding image points to be transmitted, which is also shown within a dashed-line rectangle and which connects the output of the motion detector 3 to the input of a known transmission circuit 5, as well as an image memory 6. The addressing and coding device 4 comprises a bridging circuit 7, an addressing and coding circuit 8 and a code concatenation circuit or chaining circuit 9. The bridging circuit 7 is coupled through its input A to the output of the notion detector 3 and through its output to a first input of the addressing and coding circuit 8. The addressing and coding circuit 8 is coupled through a first output to the input of the code concatenation circuit 9. The output of said circuit 9 constitutes the output of the addressing and coding device 4. The image memory 6 is coupled to a second output of the addressing and coding circuit 8 for storing the coded image samples, for restituting on a first output the image samples stored in a first data line which connects the image memory 6 to the second input of the addressing and coding circuit 8 and for restituting on a second output the samples stored in a second data line which connects the image memory 6 to a second input of the motion detector 3. The digital video signal received on the input 2 of the transmitter is also applied to an input B of the addressing and coding circuit. The output of the transmission circuit 5 is coupled through the output 10 of the transmitter to the input of a link channel 11 which connects the transmitter 1 to the television receiver, one example of construction of which is shown in FIG. 3.

Figure 3:
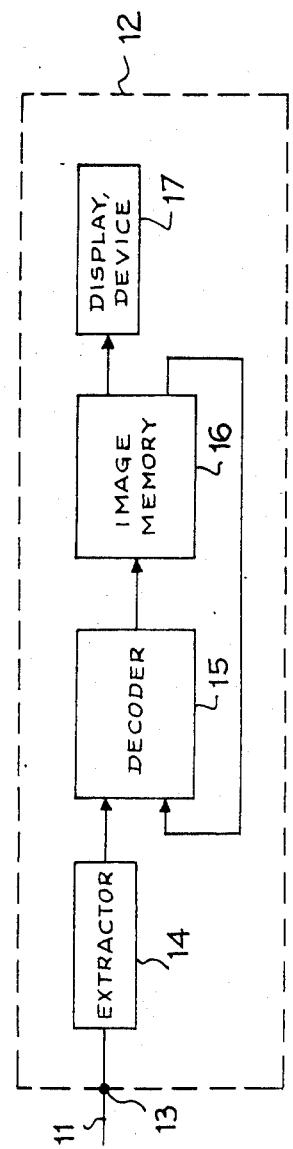
FIG. 3 is a general block diagram of a receiver which operates with the conditional-replenishment transmitter of FIG. 1.

The receiver 12 shown in FIG. 3 within a dashed-line rectangle is coupled through its input 13 to the link channel 11 and comprises in known manner an extractor 14 for extracting the video data from the digital signal train transported by the link channel 11, a decoder 15 which has the function of decoding the received digital signal train and the output of which is coupled to the input of an image memory 16, a first data output of which is coupled to a visual display device 17 and a second data output of which is coupled to a second input of the decoder 15.

The operation of the transmitter and of the receiver which have just been described with reference to the diagrams of FIGS. 2, 3 and 4 will now be explained with reference to FIGS. 5 and 6. In the example described, the digital video signal which is applied to the input 2 of the transmitter is constituted by digital samples coded on fixed bit lengths each composed for example of eight bits and applied to the input of the moving detector 3. Each sample is compared with a corresponding sample of the previous image stored in the image memory 6 and applied to the second input of the moving detector. The difference $d_i$ between the digital value of the signal sample of the current point applied to the input of the moving detector and the digital value of the corresponding point of the previous image transmitted by the image memory 6 is measured by the moving detector 3 which decides, as a function of the value $d_i$ obtained, which points have changed from one image to the next. This decision can be made by ascertaining that the difference in absolute value $d_i$ is greater than a predetermined reference threshold $S_0$, in which case the point $P_i$ corresponding to the signal sample i applied to the input of the transmitter will be stated as moving or, if this is not the case, the point $P_i$ will be stated as fixed. Alternatively, the decision can be made by analyzing the inter-image difference at a number n of points which are adjacent to the scanned point $P_i$ and which may or may not be located on each side of this latter, then by computing, for example, the sum of relative divergences at absolute value in the differences between the values of luminance and/or chrominance of each point adjacent to the scanned point and the value of luminance and/or chrominance of the scanned point $P_i$ and by ascertaining that this sum is higher than a predetermined threshold, which corresponds to the equation $$\sum_{K=-n}^{K=n} |d(i-k)| > S_1 \tag{2}$$

When equation (2) is verified, the point $P_i$ is stated to be in motion.

Moving detectors which operate on this principle are well-known and reference can be made, for example, to the description given on this subject in French patent Application No. 2,387,557 incorporated herein by reference.

The output of the moving detector 3 retransmits the decisions obtained to the input of the addressing and coding device 4 and each image point is again coded at two levels, namely a first level or "0" level when no movement is detected and a second level or "1" level when a movement is detected. In this manner, the output of the moving detector retransmits an image having two levels. The design function of the addressing and coding device 4 is to make it possible, by means of the bits supplied by the moving detector, to produce the information required at the receiver in order to reconstruct the moving image while ensuring appreciable compression of the data transmitted over the transmission channel 11. This aim is achieved by the addressing and coding device 4 which utilizes methods of differential coding in order to code the signal samples to be transmitted and which transmits only the position of the xoving zones and the value of luminance of the points which have changed. The bridging circuit 7 serves to remove the "dirty window" defects described earlier while detecting the widened zones located between two consecutive moving zones and carrying out the operation which consists in bridging the moving zones of the image. After shaping, the signals delivered by the addressing and coding device 4 are transmitted over channel 11 via the transmission circuit 5. On reception, the receiver 12 of FIG. 3 reconstructs the image from the received data and from the previous image stored within the image memory 16.

In order to dissociate the two series of codes $\{\Delta_i\}$ and $\{C_i\}$ which may follow an identification of position or of address $AD_i$ in the digital train of transmitted codes, the decoder 15 of the receiver must be provided with processing means for comparing each received address $AD_i$ with the address ADF of the end of the zone indicated by the end-of-zone word MF previously received and for computing the difference $N_i=AD_i-ADF-1$. If the difference $N_i$ is greater than the predetermined fixed number $N_o$ which defines the bridge size, the codes which follow the word $AD_i$ will be interpreted by the decoder as codes $C_i$. On the other hand, if the difference $N_i$ is smaller than the number $N_o$, the codes in number $N_i$ which follow will be interpreted as codes $\Delta_i$. The processing means for carrying out the operations mentioned above come within the category of arrangements which are well-known to those versed in the art and therefore call for no extended description.

One example of construction of the addressing and coding device 4 will now be described with reference to FIG. 4. In this figure, the bridging circuit 7, the addressing and coding circuit 8, the concatenation circuit 9 are shown within dashed-line rectangles. The bridging circuit 7 comprises a shift register 18 constituted by six flip-flops mounted in series, the input of the first flip-flop being connected to the input A of the bridging circuit to which are applied the bits transmitted by the motion detector 3. The first four outputs Q1, Q2, Q3 and Q4 of the four first flip-flops of the shift register 18 are connected respectively to the four inputs of an OR-circuit 19, the output of which is connected to a first input of an AND-gate 20. The second input of the AND-gate 20 is connected to the output Q6 of the sixth flip-flop of the shift register 18 and is connected through its output to a first input of an OR-gate 21. The second input of the OR-gate 21 is connected to the output of a flip-flop 22. The output of the OR-gate 21 is connected to a first input of an AND-gate 23, the output of which delivers a bridged-zone signal D for indicating that the points presently detected are within a widened zone. The second input of the AND-gate 23 is connected to the output Q5 of the fifth flip-flop of the shift register 18 through an inverting amplifier 24. The bridging circuit 7 further comprises an AND-gate 25, the output of which delivers an end-of-zone signal FZ. The AND-gate 25 has a first input connected to the output Q5 of the fifth flip-flop of the shift register 18 and has a second input coupled to the output Q4 of the fourth flip-flop of the shift register 18 through an inverting amplifier 26. The bridging circuit 7 also comprises an AND-gate 27, the output of which delivers a start-of-zone signal DZ. The AND-gate 27 has two inputs. A first input is connected to the output Q5 of the fifth flip-flop of the shift register 18 and the second input is connected to the output Q6 of the sixth flip-flop of the shift register 18 through an inverting amplifier 28.

Figure 4:
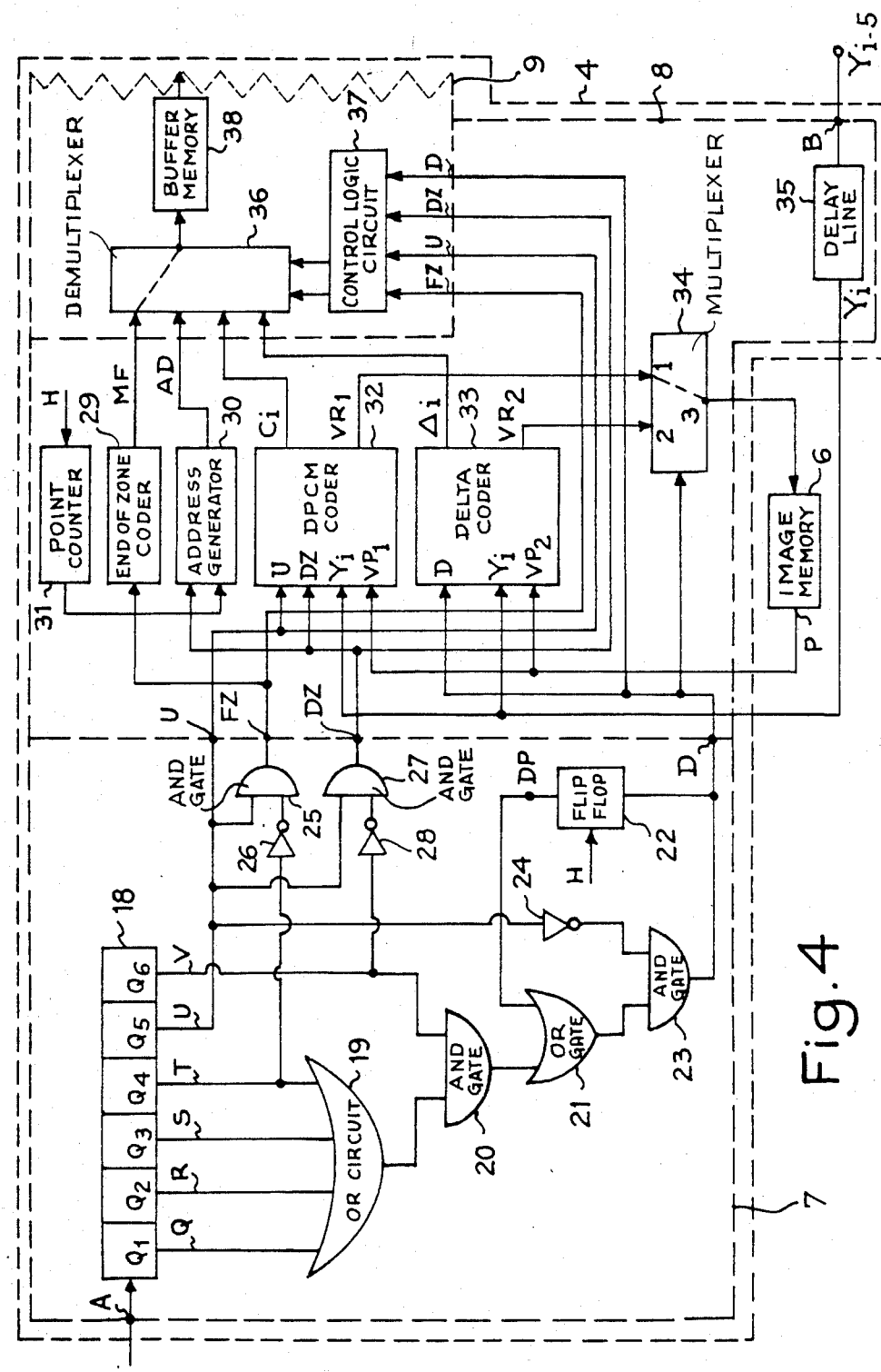
FIG. 4 is a detailed representation of the device for addressing and coding the image points to be transmitted in accordance with FIG. 1.

The bridging circuit of FIG. 4 permits bridge connections between moving zones spaced at a maximum distance of four image points on one and the same line. The bridge connections between consecutive moving zones are established by detection on each image line of the end-of-zone limit of each moving zone, of the start of the moving zone which follows, and by determining the number of points located within the space provided on each line between one end of zone and the start of the following zone. The items of information are supplied from the binary state of the signals Q, R, S, T, U, V delivered respectively by the outputs Q1 to Q6 of the shift register 18. The end-of-zone information is supplied when the signal T has the logical value 0 and when the signal U has the logical value 1. The start-of-zone signal DZ is delivered by the output of the AND-gate 27 when the signal U has the logical value 1 and when the signal V has simultaneously the logical value 0. The signal D providing a bridged-zone indication is delivered by the AND-gate 23 and assumes the logical level 1 when the signals V and U have simultaneously and respectively the values 1 and 0 and when any one of the signals Q, R, S, T has the logical value 1. The signal D can also assume the logical value 1 when, at a given instant, the signal U has the logical value 0 and when, at the previous instant, the signal D exhibited the logical value 1. This last-mentioned operation is performed by virtue of the fact that the value of the signal D is stored at each instant in the flip-flop 22. The signals U, FZ, DZ and D are transmitted to the addressing and coding circuit 8 whose function is to code differently the points located in the moving zones and the points located within a bridged zone or a widened zone detected by the bridging circuit 7 which has just been described.

The addressing and coding circuit 8 shown in FIG. 4 comprises an end-of-zone coder 29, an address generator 30 for delivering the address of the beginnings of zones stated to be in motion, a point counter 31, a differential coder 32 of the differential pulse-code modulation (DPCM) type, a coder 33 of the Delta type, a multiplexer 34 and a delay line 35, the luminance and/or chrominance samples $Y_{i-5}$ of the television signal being applied to the input of said delay line.

The end-of-zone coder 29 is connected through its input to the output of the AND-gate 25 and delivers a fixed-value code MF at its output each time an end-of-zone signal FZ is delivered by the AND-gate 25.

The address generator 30 is connected through a first input to the output of a point counter 31 which counts at the rate of a clock signal H delivered by a clock circuit (not shown in the drawings) the points sampled in succession on one and the same image line. The contents of the counter 31 are loaded into the address generator 30 under the control of the start-of-zone signal DZ applied to the second input of the address generator 30.

The DPCM coder 32 is a differential coder of known type corresponding for example to those described in French patent Applications Nos. 81 20 167 and 82 14 434 filed in the name of the present Applicant. The coder 32 has four inputs. A first input of said coder is connected to the output $Q_5$ of the register 18 which delivers the signal U. A second input is connected to the output of the gate 27 which delivers the signal DZ. A third input is connected to the output of the delay line 35 which delivers the luminance and/or chrominance samples $Y_i$ of the television signal. A fourth input is connected to the output of the image memory 6 which delivers a prediction value $VP_1$. The sample $Y_i$ to be coded is reduced by the prediction value $VP_1$ by an internal circuit of the coder 32 (not shown) and the difference obtained, or prediction error, is coded within the coder by an internal coder circuit (not shown) constituted in known manner by a quantizer and a code allocator. The code $C_i$ obtained and corresponding to the sample $Y_i$ is applied by the code allocator to a first output of the coder 32. A second output of the coder 32 applies a reconstructed value $VR_1$ of the sample to the input of the image memory 6 via a switching device 34 in order to associate a prediction $VP_1$ value with the reconstructed value $VR_1$ of the sample. Said prediction value is stored in the memory 6 and will be employed for coding the following sample.

The Delta coder 33 has three inputs. A first input of said coder is connected to the output of the AND-gate 23 for transmitting the signal D. A second input is connected to the output of the delay line 35 for transmitting the signal sample $Y_i$. The third input is connected to the prediction output VP of the image memory 6. The coder 33 is of the differential type like the coder 32 except for the fact that the code allocator which is internal to the coder codes the prediction error with a single bit. The corresponding code value $\Delta_i$ is delivered by the code allocator of the coder 33 at a first output of said coder and the reconstructed value $VR_2$ is applied to the input of the image memory 6 through the switching device 34 in order to associate a prediction value $VP_2$ with the reconstructed value $VR_2$. Said prediction value will be employed for coding the following sample.

Among other circuitry, circuit 9 may include a four-input demultiplexer 36 controlled by a control logic circuit 37, and a buffer memory 38 having an input connected to the output of the demultiplexer 36. The code concatenation circuit 9 has the function of producing catenas of the type shown in FIG. 1. The inputs of the demultiplexer 36 are connected respectively to the outputs of the coder 29, of the address generator 30, of the coder 32 and of the coder 33. The control logic circuit 37 also has four inputs which are connected respectively to the output of the AND-gate 25, to the output $Q_5$ of the register 18, to the output of the AND-gate 27 and to the output of the AND-gate 23. When the signal DZ is applied to the corresponding input of the control logic circuit 37, the address word AD delivered by the address generator 30 is transferred by the demultiplexer 36 into the buffer memory 38. The end-of-zone word MF delivered by the coder 29 is transferred into the buffer memory 38 when the end-of-zone signal FZ is applied to the corresponding input of the control logic circuit. The code words $C_i$ and $\Delta_i$ are transferred into the buffer memory 38 when the signals U and D respectively are applied to the corresponding inputs of the control logic circuit 37 in order to be subsequently directed in the order of concatenation established in the transmission channel 11 via the transmission circuits 5 of FIG. 2.

Although the principle of the present invention has been described above with reference to a specific example of construction, it must be understood that the foregoing description of the invention has been given solely by way of example and does not imply any limitation in regard to the scope of the invention.

Other alternative forms of construction are in fact possible, especially by modifying the order of concatenation of the codes and of the zone identification data or by employing coding methods other than those considered in the foregoing.

What is claimed is:

1. A method of coding television image signals in a conditional-replenishment television system, comprising the steps of:
   detecting, in each of a plurality of image lines, fixed points and moving points, said moving points representing a change in luminance and/or chrominance in the point with respect to a previous image;
   identifying, within each image line, first zones containing moving points, and second zones containing fixed points, each zone having a beginning point and an end point;

bridging first zones by constructing bridging zones, each bridging zone containing fixed points which are within a predetermined number of points between an end point of one first zone and a beginning point of another first zone;

coding the image points in each first zone with a first code representing value of luminance and/or chrominance for each moving point;

identifying each first code with identification signals which identify the beginning and end points of each first zone;

coding the image points in each bridging zone with a second code representing values of luminance and/or chrominance for each image point in said bridging zone; and concatenating said identification signals, said first code, and said second code to form a concatenated series for each television image.

2. A method according to claim 1, further comprising the step of identifying positions of said first zones by means of said identification signals and of concatenating in a predetermined order said identification signals, said first code, and said second code in order to transmit the concatenated series thus obtained.

3. A method according to claim 2 wherein said detecting step includes the steps of (a) measuring the difference between a digital value of a presently detected image point and a digital value of a corresponding image point in said previous image, (b) comparing the difference obtained with a predetermined reference threshold value and, (c) selecting as moving points those points for which the difference obtained is greater than the predetermined reference threshold value.

4. A method according to claim 3 wherein said detecting step includes the steps of (a) analyzing an inter-image difference of a plurality of adjacent points n of a scanned image point, (b) computing the sum of relative divergences at absolute value in the difference between the values of luminance and/or chrominance of each adjacent point of the scanned point and the value of luminance and/or chrominance of the scanned image point, and (c) selecting the point as a moving point when said sum is higher than a predetermined threshold value.

5. A method according to claim 4, wherein the step of coding the image points in each first zone includes the step of differential coding of the differential pulse-code modulation (DPCM) type.

6. A method according to claim 5, wherein the step of coding the image points in each bridging zone includes the steps of coding of the DPCM Delta type on a binary element with inter-image prediction.

7. A method according to claim 6 wherein said concatenating step includes the step of storing the first code in the order of detection of the image points by causing each second code to be preceded by an identification signal associated with a following first code and by placing at the end of each first code a word which indicates the end of said first code, and wherein said concatenating step includes the further step of interposing in each first code the second code of a corresponding adjacent bridging zone in between the identification signal preceding each first code and the following first code.

8. A method according to claim 1 further including the step of transmitting the concatenated series.

9. A method according to claim 1 wherein said bridging step includes the step of constructing bridging zones where said one first zone and said another first zone are on adjacent image lines.

10. A method according to claim 1 wherein said bridging step includes the step of constructing bridging zones where said one first zone and said another first zone are within a predetermined number of image lines from each other.

11. Apparatus for coding television image signals in a conditional-replenishment television system, comprising:

means for (a) detecting, in each of a plurality of image lines, fixed points and moving points, said moving points representing a change in luminance and/or chrominance in the point with respect to a previous image, (b) identifying, within each image line, first zones containing moving points, and second zones containing fixed points, each zone having a beginning point and an end point;

means for bridging first zones by constructing bridging zones, each bridging zone containing fixed points which are within a predetermined number of points between one first zone and another first zone;

means for (a) coding the image points in each first zone with a first code representing values of luminance and/or chrominance for each moving point, (b) identifying each first code with identification signals identifying beginning and end points of each first zone, and (c) coding the image points in each bridging zone with a second code representing values of luminance and/or chrominance for each image point in said bridging zone; and means for concatenating said dietification signals, said first code, and said second code to form a concatenated series for each television image.

12. Apparatus according to claim 11, wherein said means for coding and identifying includes a first differential coder, controlled by the detecting and identifying means, for coding the points detected as moving points in accordance with said first code, and a second differential coder for coding the points of said bridging zones in accordance with said second code.

13. Apparatus according to claim 12, wherein the means for concatenating includes a buffer memory connected to outputs of the first and second differential coders through a demultiplexer controlled by outputs of the detecting means which deliver for each image line the beginning points and end points of said first zones and by an output of the means for bridging when the length of a space between two consecutive first zones is shorter than predetermined length.

14. Apparatus according to claim 11 further including means for transmitting the concatenated series.

15. Apparatus according to claim 11 wherein said bridging means includes means for constructing bridging zones where said one first zone and said another first zone are on adjacent image lines.

16. Apparatus according to claim 11 wherein said bridging means includes means for constructing bridging zones where said one first zone and said another first zone are within a predetermined number of image lines from each other.

* * * * *